Nov. 20, 1962                H. SIGG                3,064,490
DRIVE FROM A DRIVING SHAFT TO A DRIVEN SHAFT IN
A GEAR ASSEMBLY DISTRIBUTED THROUGH TWO
PARALLEL INTERMEDIATE SHAFTS
Filed July 1, 1960                           2 Sheets-Sheet 1
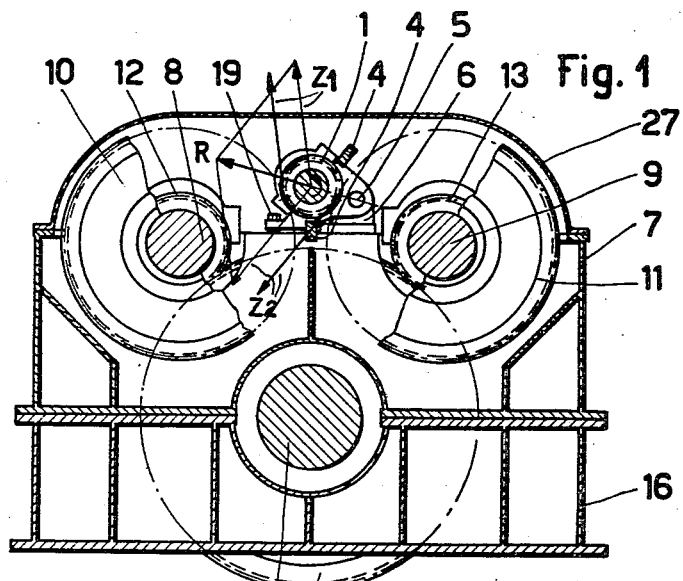
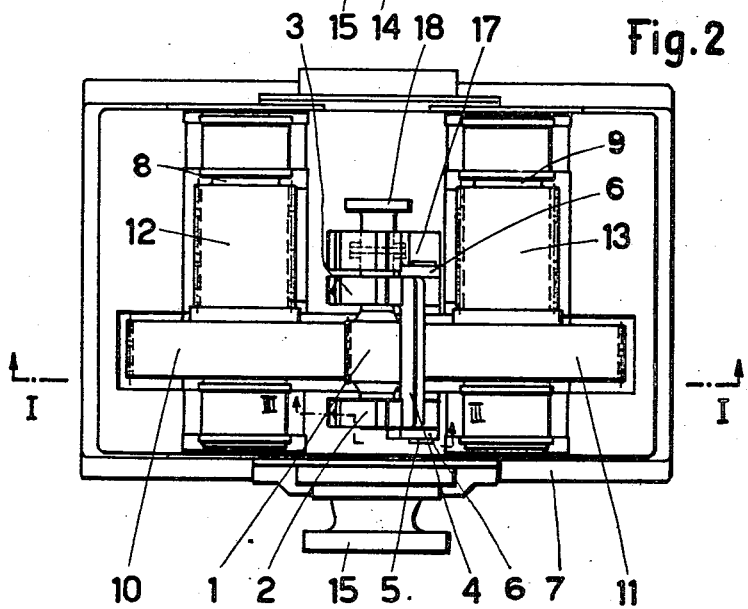
Inventor
Hans Sigg
By
Wenderoth, Lind & Ponack
Attorneys Nov. 20, 1962                 H. SIGG                     3,064,490
DRIVE FROM A DRIVING SHAFT TO A DRIVEN SHAFT IN
A GEAR ASSEMBLY DISTRIBUTED THROUGH TWO
PARALLEL INTERMEDIATE SHAFTS Filed July 1, 1960                                  2 Sheets-Sheet 2

Inventor
Hans Sigg
By
Wenderoth, Lind & Ponack
Attorneys

United States Patent Office 3,064,490
Patented Nov. 20, 1962

3,064,490
DRIVE FROM A DRIVING SHAFT TO A DRIVEN SHAFT IN A GEAR ASSEMBLY DISTRIBUTED THROUGH TWO PARALLEL INTERMEDIATE SHAFTS
Hans Sigg, Zurich, Switzerland, assignor to Maag Gear Wheel & Machine Company Limited, Zurich, Switzerland
Filed July 1, 1960, Ser. No. 40,376
Claims priority, application Switzerland July 9, 1959
5 Claims. (Cl. 74—410)

This invention relates to a gear assembly in which the drive from a driving shaft to a driven shaft is distributed through two parallel intermediate shafts both of which are connected to the driving and driven shafts, and to means for equalizing the loads on the two intermediate shafts.

Gear assemblies of the kind referred to are known in which uniform load distribution has been achieved by incorporation of torsion shafts in the intermediate shafts. This method of construction, however, requires a relatively large number of bearings, and results in considerable over-all lengths with correspondingly heavy casings.

An object of the present invention is to ensure uniform load distribution through the intermediate shafts satisfactorily and at all load stages, wtihout involving any substantial increase in size and cost of the gear assembly.

A gear assembly of the kind referred to is characterized in that the driving shaft adjusts itself automatically to equalize the load distribution in a predetermined direction of rotation through the two parallel intermediate shafts, movement of the axis of the driving shaft to obtain said adjustment being effected in a plane perpendicular to the axis and substantially perpendicular to the resultant of two equally large forces applied by gear wheels on the intermediate shafts to a gear wheel on the driving shaft.

The invention is illustrated in the accompanying drawings, wherein:

FIGURE 1 is a sectional view of one form of the invention, taken on section line I—I of FIG. 2;

FIGURE 2 is a plan view of FIG. 1 with the cover removed.

Figure 3:
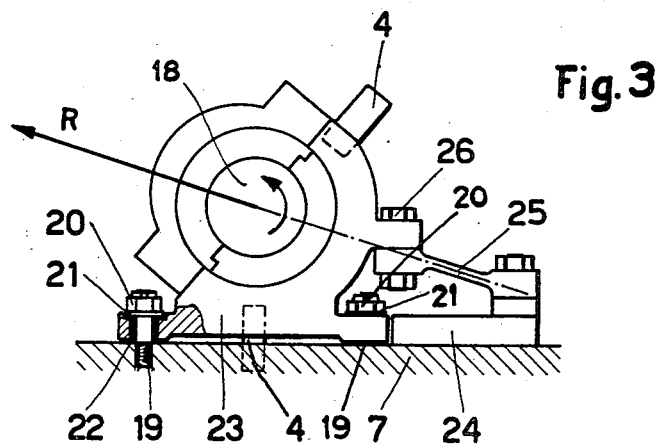
FIGURE 3 is an enlarged elevation of a modified form of a detail, partly in section on section line III—III of FIGURE 4.

A gear wheel 1 is mounted on a driving shaft 18 which is journalled on both axial sides of the gear wheel 1 in bearings 2 and 3 which are connected together by yokes 4 in a manner resistant to bending and torsion. The bearings 2 and 3 are mounted for rocking in common about a pivot 5. A bearing bracket 6, in which the pivot 5 is fixed, is mounted on a casing 7.

Two intermediate shafts 8 and 9 are journalled in the casing 7. Transmission gear wheels 10 and 11, which each mesh with the driving gear wheel 1, are mounted rigidly on the shafts 8 and 9, respectively. Transmission gear wheels 12 and 13 also are mounted rigidly on the shafts 8 and 9, respectively, and each wheel 12 and 13 meshes with a driven gear wheel 14 which is mounted on a driven shaft 15.

The shaft 15 is journalled in the casing 7 and its base 16. Besides the bearing bracket 6, a further bearing bracket 17 is fixed to or combined with the casing 7 and carries an axial or thrust bearing, for example a Michell bearing, which prevents axial movement of the shaft 18 and takes up any axial thrusts of the said shaft. The shaft 18, however, can move freely in the axial or thrust bearing in an arcuate direction about the pivot 5. The shaft 18 is preferably driven by a flexible coupling, for example a toothed coupling, not shown, which is movable to an extent such that it can readily take up small rocking movements of the bearings 2 and 3. These rocking or adjusting movements automatically provide for the load equalization of the power transmission through the two intermediate shafts 8 and 9.

The arrow $Z_1$ (FIGURE 1) indicates the tooth pressure or tooth force of the intermediate transmission wheel 10 on the driving wheel 1, while the arrow $Z_2$ indicates the tooth pressure or tooth force of the intermediate transmission wheel 11 on the driving wheel 1. The arrow around the axis of the driving wheel 1 indicates its direction of rotation. If the tooth forces $Z_1$ and $Z_2$, assumed to be of equal magnitude, are displaced parallel to themselves on to the axis of the driving wheel 1 a resultant force R is obtained. For load equalization with equally large tooth forces $Z_1$ and $Z_2$, the rocking axis 5 must lie on the line of the resultant R. Once the position of the axis of the driving wheel 1 has been fixed, rocking or adjusting movements are only to be expected from very small deformations or pitch errors in the teeth.

Screws 19 are provided in the bearings 2 and 3, and engaging the casing 7, so that, in the event of any failure of either of the intermediate transmission wheels 10 or 11, transmission of power can nevertheless take place. A screw 19 is shown in detail on a larger scale in FIGURE 3; it is fast in the casing 7. A nut 20 presses a washer 21 on to a distance bushing 22 which is somewhat longer than a corresponding bore in the bearings 2 and 3, or the bearing 23 in FIGURE 3. If only one tooth pressure $Z_1$ or $Z_2$ is operative, the bearing is supported either on the washer 21 or on the casing 7. These limiting elements 19, 20, 21, 22 also become operative should the direction of rotation of the gears alter.

Figure 4:
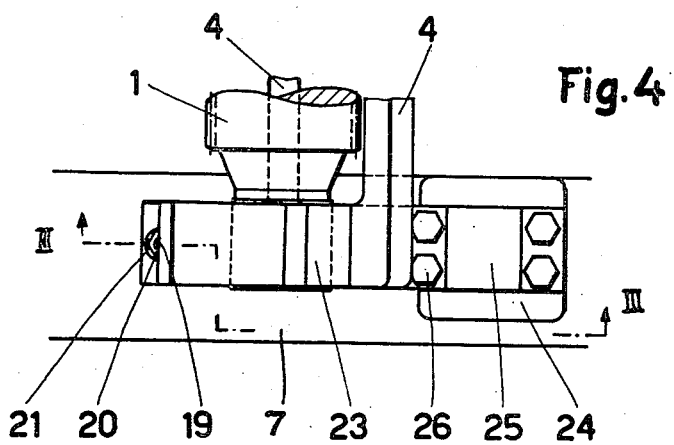
FIGURE 4 is a plan view of FIGURE 3.

A cover 27 is provided on the casing 7. A modification of the means which permits rocking adjustment of the driving shaft 18 is shown in FIGURES 3 and 4. A bracket 24 together with a web 25 are secured to the casing 7. A bearing 23 for the shaft 18 is connected to the web 25 by screws 26, the web possessing a certain elasticity and permitting a deflection perpendicular to or approximately perpendicular to the resultant R. The web 25 lies in the line of the resultant R. The yokes 4 connect the bearing 23 to another bearing which is analogous to bearing 3 in FIGURE 2.

In the arrangement described and shown, complete load equalization between the parallel intermediate shafts 8 and 9 is ensured at all load stages, since the direction of the resultant R remains the same for any load. For achieving load equalization, all that is required is free and automatic adjustment in the plane perpendicular to the axis of the driving shaft 18 and perpendicular or substantially perpendicular to the resultant R, which is made possible by the arrangement described and shown. Manufacturing tolerances have an extremely small influence on the load distribution, since slight departures from the theoretical position of the driving shaft result in only very small differences in magnitude between the tooth forces $Z_1$ and $Z_2$.

The invention may also be applied to a plurality of driving shafts, in which case, however, two parallel intermediate shafts acting on the same driven shaft are associated with each driving shaft.

Adjustment of the axis of the driving shaft 18 in the said direction may also be effected by means of a rectilinear guide within the scope of the invention. The adjustment described and shown, by rocking about the pivot 5, gives the theoretically required direction only at one point; the result thereby obtained in practice is perfectly satisfactory, as is also that obtained by means of the web 25.

It is thought that the invention and its advantages will be understood from the foregoing description and it is apparent that various changes may be made in the process, form, construction and arrangement of the parts without departing from the spirit and scope of the invention or sacrificing its material advantages, the form hereinbefore described and illustrated in the drawings being merely a preferred embodiment thereof.

I claim:
1. A gear assembly comprising a driving shaft having a gear, a driven shaft having a gear, two parallel intermediate shafts having gears interposed between and meshing with said driving and driven shaft gears, said driving shaft with said driving gear adjusting itself automatically when rotating in a predetermined direction to equalize the load distribution in one direction of revolution through said two parallel intermediate shafts, said adjusting movement of the axis of the driving shaft to obtain said adjustment being effected in a plane perpendicular to the said axis and substantially perpendicular to the resultant of two equally larger forces applied by said gears on said intermediate shafts to said gear wheel on said driving shaft.

2. A gear assembly as set forth in claim 1 wherein said automatic adjustment of said driving shaft is obtained by mounting said shaft to rock about a pivot the center of which lies substantially on the line of said resultant.

3. A gear assembly as set forth in claim 1 wherein said automatic adjustment of said driving shaft is obtained by mounting said shaft on a resilient web, the longitudinal axis of said web substantially coinciding with the line of said resultant.

4. A gear assembly as set forth in claim 1 wherein said automatic adjustment is restricted by limiting elements within narrow, adjustable tolerances.

5. A gear assembly as set forth in claim 1 wherein said driving shaft is adjustably journalled on both sides of said gear mounted thereon and is held fast against axial movement by a further bearing.

References Cited in the file of this patent

UNITED STATES PATENTS

| | | |
|---|---|---|
| 1,455,421 | Ayers | May 15, 1923 |
| 1,591,826 | Hodgkinson | July 6, 1926 |
| 1,621,053 | Besse | Mar. 15, 1927 |
| 1,847,611 | Hodgkinson | Mar. 1, 1932 |
| 2,114,660 | Thalmann | Apr. 19, 1938 |
| 2,337,501 | Schmidt | Dec. 21, 1943 |
| 2,513,217 | Tomlines | June 27, 1950 |
| 2,638,388 | Tunley | May 12, 1953 |